Dec. 8, 1925.
F. S. MARCELLUS
1,564,877
COMMUTATION DEVICE FOR METERS
Filed Nov. 2, 1923
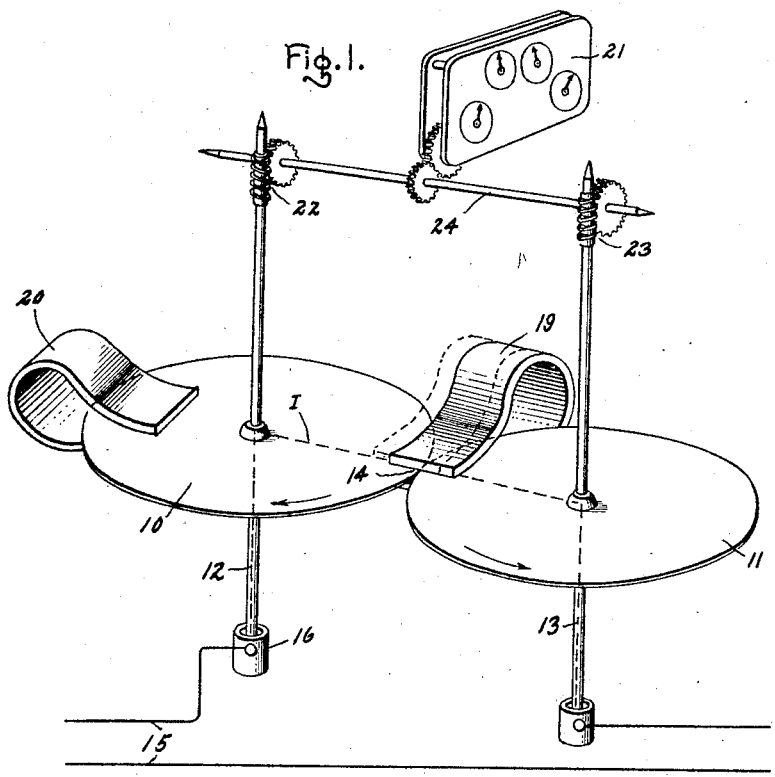
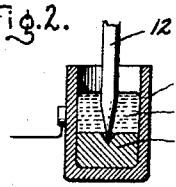
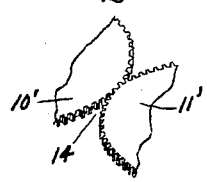
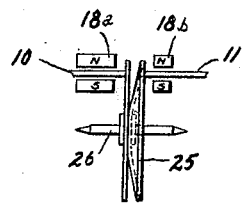
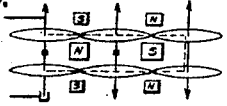
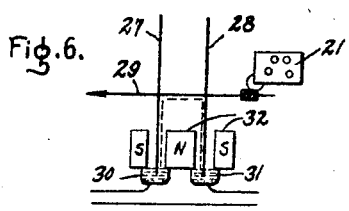
Inventor:
Fredrick S. Marcellus,
by
His Attorney.

Patented Dec. 8, 1925.

1,564,877

UNITED STATES PATENT OFFICE.

FREDRICK S. MARCELLUS, OF AMSTERDAM, NEW YORK, ASSIGNOR TO GENERAL ELECTRIC COMPANY, A CORPORATION OF NEW YORK.

COMMUTATION DEVICE FOR METERS.

Application filed November 2, 1923. Serial No. 672,440.

*To all whom it may concern:*

Be it known that I, FREDRICK S. MARCELLUS, a citizen of the United States, residing at Amsterdam, in the county of Montgomery, State of New York, have invented certain new and useful Improvements in Commutation Devices for Meters, of which the following is a specification.

My invention relates to dynamo electric machines such as used for electric meters, electric relays and the like and in particular to the commutation of such devices.

It is common practice to commutate meter motors by contacting commutator and brushes which move relative to each other, or, in a mercury meter, to revolve a disc in a mercury bath which takes the place of the usual stationary brushes. The known arrangements have appreciable friction which in itself is not so objectionable as the fact that the friction varies due to wear of the contacting surfaces in the first arrangement and the deterioration of the mercury and the mercury disc in the mercury meter. This variation in the friction losses affects the calibration of the meter. It is evident that the smaller these friction losses are, and the smaller the variation in these friction losses over considerable periods of time, the greater will be the continuous accuracy of the meter.

It is the primary object of my invention to provide a commutating device or system for electric meters in which the friction and particularly the variation in friction is reduced to a value where it does not appreciably affect the calibration of the instrument over long periods of time.

In carrying my invention into effect, I provide a rotative system having one or more conducting discs, commutate the disc or discs in a novel manner so that the current is caused to flow in a radial direction and provide a stationary field system embracing a portion of the disc or discs through which the current must flow.

The features of my invention which I believe to be novel and patentable will be pointed out in the claims appended hereto. For a better understanding of my invention, reference is made in the following description to the accompanying drawing, Fig. 1 of which shows a preferred modification of my invention applied to an ampere hour meter; Fig. 2, a suitable electric terminal for my improved meter; Figs. 3 and 4 alternative modifications of the contacting surfaces between the rotating parts of the instrument shown in Fig. 1; and Figs. 5 and 6 show other arrangements of the rotating parts.

In Fig. 1, I have shown my invention applied to an ampere hour meter. 10 and 11 illustrate a pair of discs of conducting material, such as copper or silver, mounted on parallel shafts 12 and 13. The shafts are rotatably mounted in the usual way. The discs 10 and 11 have their peripheries lightly but accurately contacted with each other, as shown at 14, so that rotation of one causes rotation of the other, although no great amount of mechanical energy is ever intended to be transferred from one to the other. This mechanical connection between the discs constitutes an electrical connection by means of which the discs are commutated. The shafts, or at least, certain portions thereof, are made of conducting material and are electrically connected to the discs at the hub so that current may be fed to the disc 10 through shaft 12, conveyed from the center of the disc to the periphery at 14, then across, through the mechanical connection to disc 11, to its center and out through shaft 13 in a manner indicated by the dotted line I.

Any suitable means may be provided to connect the shafts to the circuit 15. Where the current is fairly heavy, mercury cup 16 (see Fig. 2) may be provided for this purpose. The lower part of the cup contains the jewel 17 for the bearing above which there is contained sufficient mercury 18 to make good electrical contact with the shaft 12. The line wire is suitably secured to the exterior of the cup which is of course made of conducting material. When the current to be commutated is very small, the usual brush or roller contact may be used on the shaft and in some cases the current may simply pass from the bearing to the shaft without any special provision being made therefor. In any event, the friction caused between the shaft and contact at this small radius is very small and substantially constant comparable to the bearing friction.

The stationary member of the meter is a field member; in this instance, a permanent magnet 19, having its north and south poles disposed above and below the disc, slightly out of contact therewith, adjacent the point 14, so that any current flowing through the discs must pass through this field producing rotation in a well known manner. Those portions of the discs lying within the field produced by the magnet 19 will, when current flows through the discs, tend to move in the same direction causing rotation of the discs in opposite directions as indicated by the arrows thereon. If the field member 19 is placed so as to embrace equal portions of the two discs, the torque developed thereby will be equal in the two discs. This is not essential however, since one disc will be rotated by the other due to the driving contact between them. In order to make a good ampere hour meter it will be preferable to provide a damping magnet, as shown at 20. This magnet is placed on an inactive portion of the disc so as not to embrace the line current I. Damping magnets could be applied to each disc, but this will be found unnecessary in most cases. When one damping magnet is employed, field member 19 may be shifted as indicated in dotted lines so as to embrace more of that disc which is damped and less of that disc which is not damped in order to keep the mechanical energy transferred between the two discs to substantially a zero value.

One or both shafts may be connected to drive the usual register indicated at 21. In case both shafts are connected to the register, the gears 22 and 23 will be arranged to drive the cross shaft 24 in the same direction with the shafts 12 and 13 rotating in opposite directions. By tying two rotating systems together in the register drive slipping between the discs at 14 is impossible. It will be evident, however, that it will usually be unnecessary to provide this double mechanical connection. With this arrangement, the friction loss and the wear at the peripheries of the discs is negligible, while the continuous rotation keeps the contacting surfaces bright so that good electrical connection will always be maintained between the discs.

Instead of having the peripheries of the discs smooth, as in Fig. 1, they may be provided with fine gears so as to mesh together as illustrated in Fig. 3 where 10' and 11' represent the two conducting discs. It may sometimes be found desirable to slightly separate the discs 10 and 11 and cause them to bear against an intermediate resilient double disclike member 25 as indicated in Fig. 4. The member 25 is rotatably mounted on an auxiliary shaft 26 and constitutes a mechanical and electrical connection between the two discs 10 and 11. In this modification, any wabbling tendency of the discs 10 and 11 will be equalized by the resilient member 24 which of course is made of conducting material in order to convey the current from one disc to the other. In this modification it will be preferable to divide the stationary field magnet into two parts as indicated at $18^a$ and $18^b$, or else, simply use one magnet on that disc which is damped.

Any number of rotating elements may be connected in series to increase the torque available in the manner indicated in Fig. 5. In this figure the current is represented as entering at the lower bearing of the left hand element. It enters the lower left hand disc, crosses through the three lower discs to the right hand shaft, enters the upper right hand disc, crosses back to the left across the three upper discs to the upper end of the left hand shaft where it passes out through the upper bearing. The upper and lower discs of the two left hand members of Fig. 5 are insulated from each other so as to cause the current to flow in the path indicated. The polarities of the field magnet system are arranged as illustrated so as to cause the three rotative elements to rotate together as a unit.

Fig. 6 shows a further modification. Here, two conducting discs 27 and 28 are mounted on a horizontal shaft 29 which electrically as well as mechanically connects the two discs together. At the lower peripheries of the discs they dip into mercury trough 30 and 31 which form the circuit terminals of the rotative part of the instrument. The field magnet system 32 is arranged as illustrated embracing those portions of the discs in which the current is caused to flow and the polarities are such as to produce rotation of the two discs in the same direction.

It will be evident that if the field member, instead of being a permanent magnet, is excited from the potential of the line, such an instrument could be used as a watthour meter and I intend to include this and other equivalent modifications within the scope of the appended claims.

In accordance with the provisions of the patent statutes, I have described the principle of operation of my invention, together with the apparatus which I now consider to represent the best embodiments thereof; but I desire to have it understood that the apparatus shown and described is only illustrative and that the invention may be carried out by other arrangements.

What I claim as new and desire to secure by Letters Patent of the United States, is:

1. A meter motor having a rotative system comprising a pair of continuous conducting discs mechanically connected for simultaneous rotation, said mechanical connection comprising an electrical connection between said discs, means for electrically connecting said discs in an external circuit through said mechanical connection in such a manner that current flowing in said circuit is caused to flow along radial lines in said discs, a stationary field for producing flux through said discs embracing the path of the circuit current, and a drag magnet embracing an otherwise electrical inactive portion of one of said discs.

2. An ampere hour meter comprising a pair of rotatable discs of continuous conducting material having their peripheries in mechanical and electrical contact, a circuit for conveying the current to be measured through the contacting portions of said discs, a stationary field magnet embracing the contacting portions of said discs, a damping magnet embracing an otherwise electrical inactive portion of one of said discs, the torques produced by the reaction between said stationary field and the current to be measured on said discs being greater on the disc provided with the drag magnet and adjusted so as to reduce the transfer of mechanical energy between said discs substantially to zero.

3. A meter motor having a rotative system comprising a pair of conducting discs having their peripheries in contact for simultaneous rotation, said mechanical contact comprising an electrical connection between said discs, means for electrically connecting said discs in an external circuit through said contact in such a manner that current flowing in said circuit is caused to flow along radial lines in said discs, a stationary field for producing a flux through said discs embracing the path of the circuit current and a mechanical driving connection between said discs other than the first mentioned mechanical connection for preventing the contact surfaces of said discs from slipping on each other.

4. A meter motor having a rotative system comprising a pair of continuous conducting discs mechanically connected for simultaneous rotation, said mechanical connections comprising an electrical connection between said discs, means for electrically connecting said discs in an external circuit through said mechanical connection in such a manner that current flowing in said circuit is caused to flow along radial lines in said discs, a stationary field magnet for producing flux through said discs embracing the path of the circuit current, a drag magnet embracing an otherwise electrically inactive portion of one of said discs only, and means other than said mechanical contact between said discs for preventing said discs from slipping on each other.

In witness whereof, I have hereunto set my hand this 1st day of November, 1923.

FREDRICK S. MARCELLUS.